(12) United States Patent
Anvekar et al.

(10) Patent No.: US 6,594,475 B1
(45) Date of Patent: Jul. 15, 2003

(54) MOBILE BATTERY DISCHARGE MINIMIZATION IN INDOOR WIRELESS NETWORKS BY ANTENNA SWITCHING

(75) Inventors: Dinesh Kashinath Anvekar, New Delhi (IN); Manpreet Singh Dang, Delhi (IN); Amol Prakash, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/392,426

(22) Filed: Sep. 9, 1999

(51) Int. Cl.[7] .............................. H04Q 7/20; H04B 7/00
(52) U.S. Cl. ..................... 455/277.1; 455/522; 455/562; 455/574; 455/101
(58) Field of Search .................... 455/522, 69, 38.3, 455/562, 574, 133–135, 277.1, 277.2, 101, 561; 340/7.32, 7.33, 7.36

(56) References Cited

U.S. PATENT DOCUMENTS

| 5,628,052 A |   | 5/1997 | DeSantis et al. | |
|---|---|---|---|---|
| 5,710,981 A |   | 1/1998 | Kim et al. | |
| 5,777,693 A | * | 7/1998 | Kishigami et al. | ........ 455/277.1 |
| 5,799,042 A | * | 8/1998 | Xiao | ........................ 455/277.2 |
| 5,835,855 A |   | 11/1998 | Burns | |
| 5,884,192 A |   | 3/1999 | Karlsson et al. | |
| 6,118,773 A | * | 9/2000 | Todd | ........................... 370/334 |
| 6,148,218 A | * | 11/2000 | Solondz | ...................... 455/562 |
| 6,211,781 B1 | * | 4/2001 | McDonald | .................. 340/505 |

* cited by examiner

Primary Examiner—Duc Nguyen
(74) Attorney, Agent, or Firm—Whitham, Curtis & Christofferson, P.C.; T. Rao Coca

(57) ABSTRACT

A method and apparatus minimize battery discharge of mobile communication devices in short range wireless radio communication networks by switching receiving antennas to minimize transmitted power for a mobile communication device. Multiple receiving antennas and at least one transmitting antenna are used. The receiving antennas are switched for each mobile communication device to minimize transmitted power required by a mobile communication device. Switching between receiving antennas is accomplished by measuring power of a signal received from a mobile communication device at each receiving antenna, and selecting a receiving antenna based on the measured power. A database of switchings is maintained for the mobile communication devices, and an initial selection of a receiving antenna is based on the last switching or a trend indicated by most recent switchings. Alternatively, the initial switching is to a centrally located receiving antenna.

17 Claims, 11 Drawing Sheets

MOBILE BATTERY DISCHARGE MINIMIZATION IN INDOOR WIRELESS NETWORKS BY ANTENNA SWITCHING

BACKGROUND OF THE INVENTION

1. Field of the Invention

The present invention generally relates to wireless communications networks and, more particularly, to indoor wireless networks in which battery discharge of mobile units is minimized by providing multiple receiving antennas and switching to a receiving antenna closest to the mobile unit.

2. Background Description

With the advent of in-building packet data wireless data communication standards, portable/personal computing devices such as laptop computers, PDAs (Personal Digital Assistants), palmtop computers, and the like will be used to access data through wireless communication links. In such systems, while wireless links eliminate cables and provide tetherless access, full mobility across the wireless network coverage area requires mobile devices to mostly operate on their batteries. It is generally desirable to maximize the interval between battery replacement or recharging by optimizing the discharge of batteries during different operations of the portable devices.

There are known methods for conserving battery charge for mobile devices such as laptop computers. For example, in laptop computers the display screen is shut off if no user input is sensed for a certain time duration, and also after certain period of inactivity a laptop computer goes to a low-power standby state.

With the advent of wireless radio connectivity provided by emerging standards, additional battery charge is consumed during communication over wireless links. While power required for receiving data is generally low, a considerable amount of battery power is used up for wireless transmissions from the mobile devices. As the required transmission power from a mobile increases with its distance from a receiving base unit (or access point), it is desirable that the distance between a mobile unit and the base station be as short as possible. However, in conventional pico-cells, as the base station antenna is located at a fixed point, the power to be transmitted by a mobile unit depends on its position within the cell. Therefore, there is a need for optimizing transmitted power for a mobile unit irrespective of its location within a cell.

Methods of reducing power consumption by mobile radio units by controlling transmitted power level are applied in practical cellular radio communication systems. Some newer methods for power control have also been proposed. For example, U.S. Pat. No. 5,710,981 describes a portable radio power control device and method using incrementally degraded received signals. The use of multiple antennas for improving performance of communication systems is well known. For instance, U.S. Pat. No. 5,884,192 describes a method of increasing sensitivity of a base station by providing a plurality of antennas and combining the received signals from the different antennas to form an estimate of the transmitted signal. Switching of antennas to optimize performance with reference to mobile units have also been proposed. U.S. Pat. No. 5,835,855 describes an antenna system with two antennas which are periodically switched to minimize throughput deterioration due to multipath effects. U.S. Pat. No. 5,628,052 describes an antenna switching method wherein the best antenna to be switched is determined by the mobile units. This requires a base station to transmit to a mobile unit via each of the different antennas and the mobile unit to inform the base station the best antenna based on parameters such as received signal strength and bit error rate. Generally methods such as this are aimed at improving throughput and error-free communications without regard to battery power consumption. However, in future short range cellular indoor wireless communication systems, a major concern is minimizing battery power consumption during wireless communications. In these systems, due to the use of techniques such as frequency hopping and very high frequencies (typically, greater than 1 GHz) generally throughputs required for the intended applications such as paging, electronic mail (E-mail), file transfers and browsing of simple Web pages are easily achieved.

SUMMARY OF THE INVENTION

It is therefore an object of the present invention to provide a method and apparatus which minimize battery discharge of mobile communication devices in short range wireless radio communication networks According to the invention, there is provided a method and apparatus for minimizing battery discharge of mobile communication devices in short range wireless radio communication networks by switching receiving antennas to minimize transmitted power for a mobile communication device. The apparatus comprises multiple receiving antennas and at least one transmitting antenna, and power measuring and antenna switching circuitry. The receiving antennas are switched for each mobile communication device to minimize transmitted power required by a mobile communication device. Switching between receiving antennas is accomplished by measuring power of a signal received from a mobile communication device at each receiving antenna, and selecting a receiving antenna based on the measured power. A database of switchings is maintained for the mobile communication devices, and an initial selection of a receiving antenna is based on the last switching or a trend indicated by most recent switchings. Alternatively, the initial switching is to a centrally located receiving antenna.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
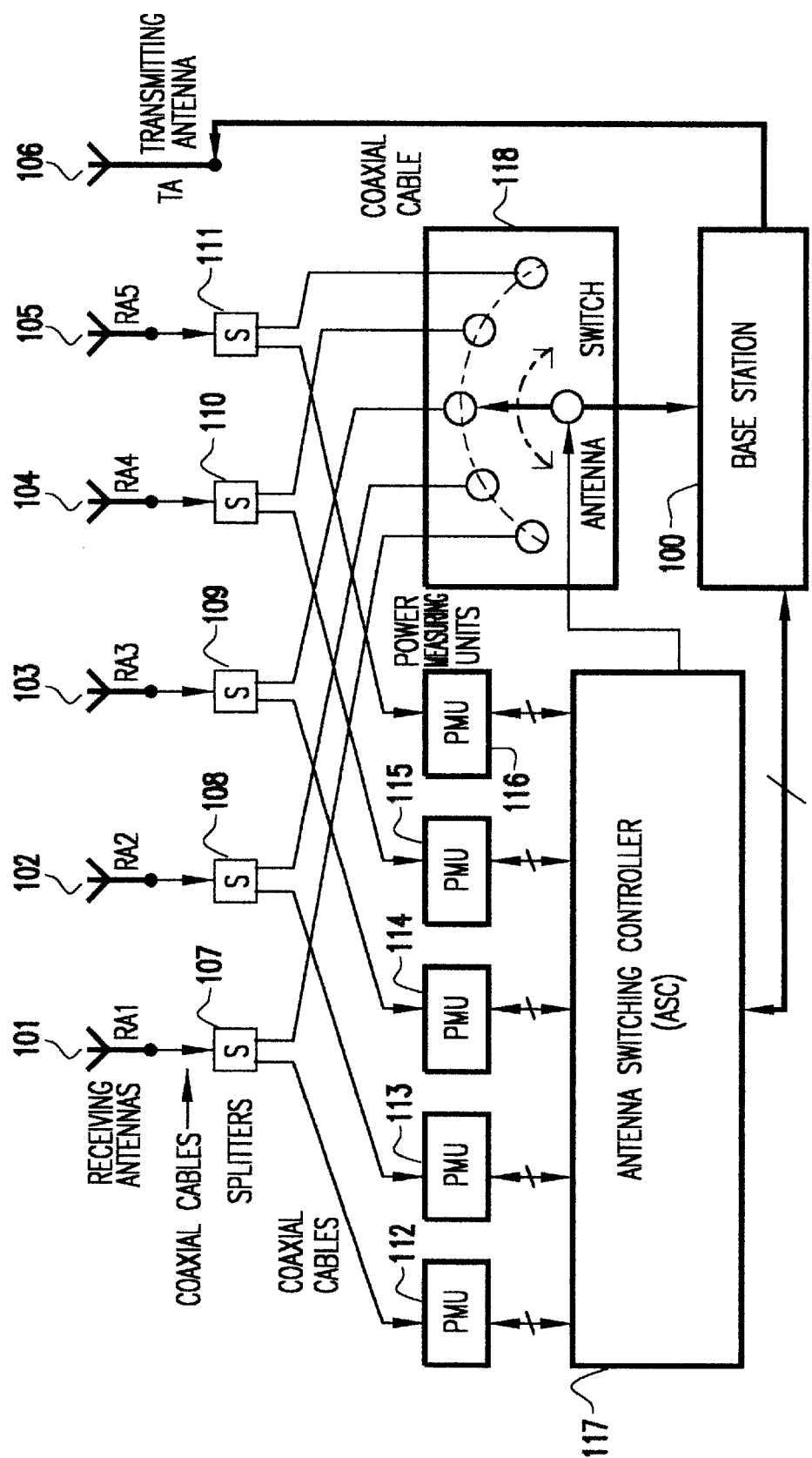
FIG. 1 is a block diagram showing the functional units and their interconnections required for receiving antenna switching.

In the practice of the invention, as generally illustrated in FIG. 1, a base station 100 of a pico-cell is associated with a number of receiving antennas 101 to 105 and a single transmitting antenna 106. For simplicity in illustration, the apparatus of this invention is shown with five receiving antennas, denoted as RA1 to RA5 in FIG. 1. There are five signal splitters 107 to 111, one for each receiving antenna 101 to 105, respectively. The signal from each receiving antenna is split into two parts by using a signal splitter S after each antenna. The strength of each part of the signal after the signal splitter is directly proportional to the strength of the incoming radio signal at the corresponding receiving antenna. The first part of the signal, which is a very small fraction of the input signal, is sent to a power measuring unit (PMU). Again as shown in FIG. 1, there is a PMU 112 to 116 corresponding to each receiving antenna 101 to 105, respectively. A PMU consists of similar hardware as in the receiver section of mobile units or base stations. It tunes to the transmission frequency of a mobile unit and determines the relative strength of the received signal excluding interfering signals, if any. The outputs of the PMUs 112 to 116 are sent to an Antenna Switching Controller (ASC) 117 which is a computing device of the complexity of currently available inexpensive microcontrollers. The ASC determines the next receiving antenna to be switched to the base station for receiving the transmissions from a mobile unit. Generally, the next antenna chosen is the one which receives the maximum signal power during the current measurement interval. However, it is possible to determine the next receiving antenna based on stored past values of signal power levels received from a mobile unit through the different receiving antennas. The ASC 117 connects the next receiving antenna to the base station 100 for further reception of packets from the mobile unit.

As shown in FIG. 1, the second and generally significant part of the received signal coming out of a splitter 107 to 111 is connected to an input of a receiving antenna switch 118 which is functionally a 1-pole, N-throw switch. At any time, the output of the switch is connected to one of the input points. The connection of the inputs to the output point is controlled by the ASC 117 as indicated above. The base station 100 receives data packets sent by a mobile unit through a receiving antenna switched by the ASC 117.

Figure 2:
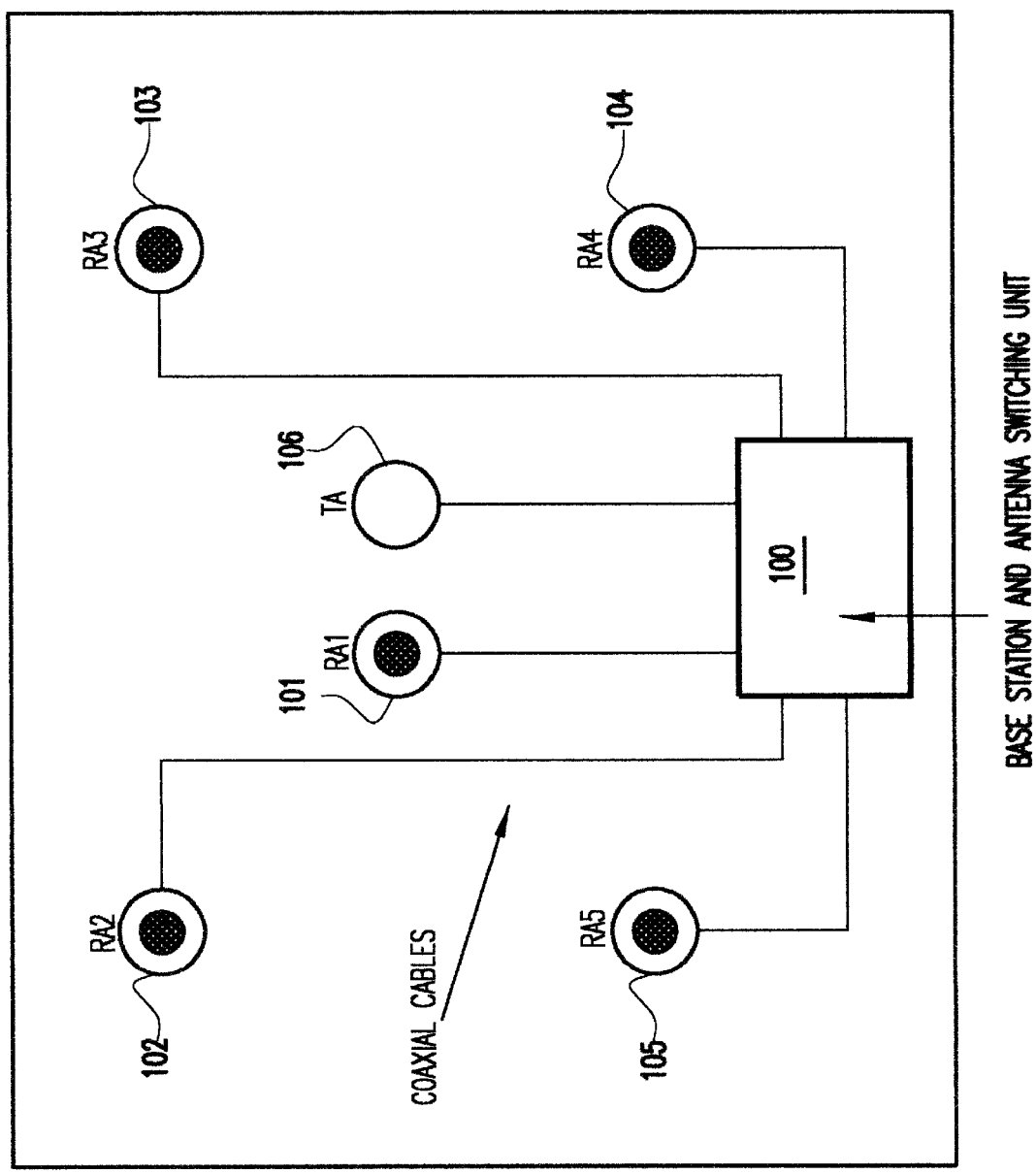
FIG. 2 is a plan view of a floor plan showing an example of a transmitting antenna and five receiving antennas within a square room.

The transmitting antenna 106 is located such that a given geographical space is covered by its transmissions and sufficiently high power levels are received by mobile units at all points within the space. The receiving antennas 101 to 105 are uniformly distributed within the coverage space to ensure requirement of optimum transmitted signal power level from a mobile unit. An example floor plan showing a possible placement of five receiving antennas and a transmitting antenna is shown in FIG. 2. As shown here, a receiving antenna 101 is preferably placed at the same location as the transmitting antenna 106 of the base station 100. However, in general, the transmitting antenna 106 of the base station 100 can be placed independently of the location of the receiving antennas.

Antenna switching operation is explained here with reference to time division duplex communication systems in which during a transmission frame, downlink transmission from base station to a mobile unit takes place during a first time-slot of the frame, and during the second time-slot of the frame, the mobile unit transmits over the uplink to the base station. The transmission frequency used by the base station and a mobile unit during the respective time-slots in the frame are different. This type of communication is used in systems based on an emerging standard. Further, in such systems, due to the use of frequency hopping scheme, the downlink and uplink frequencies used for every frame are different, but the method described here still holds good.

Figure 3:
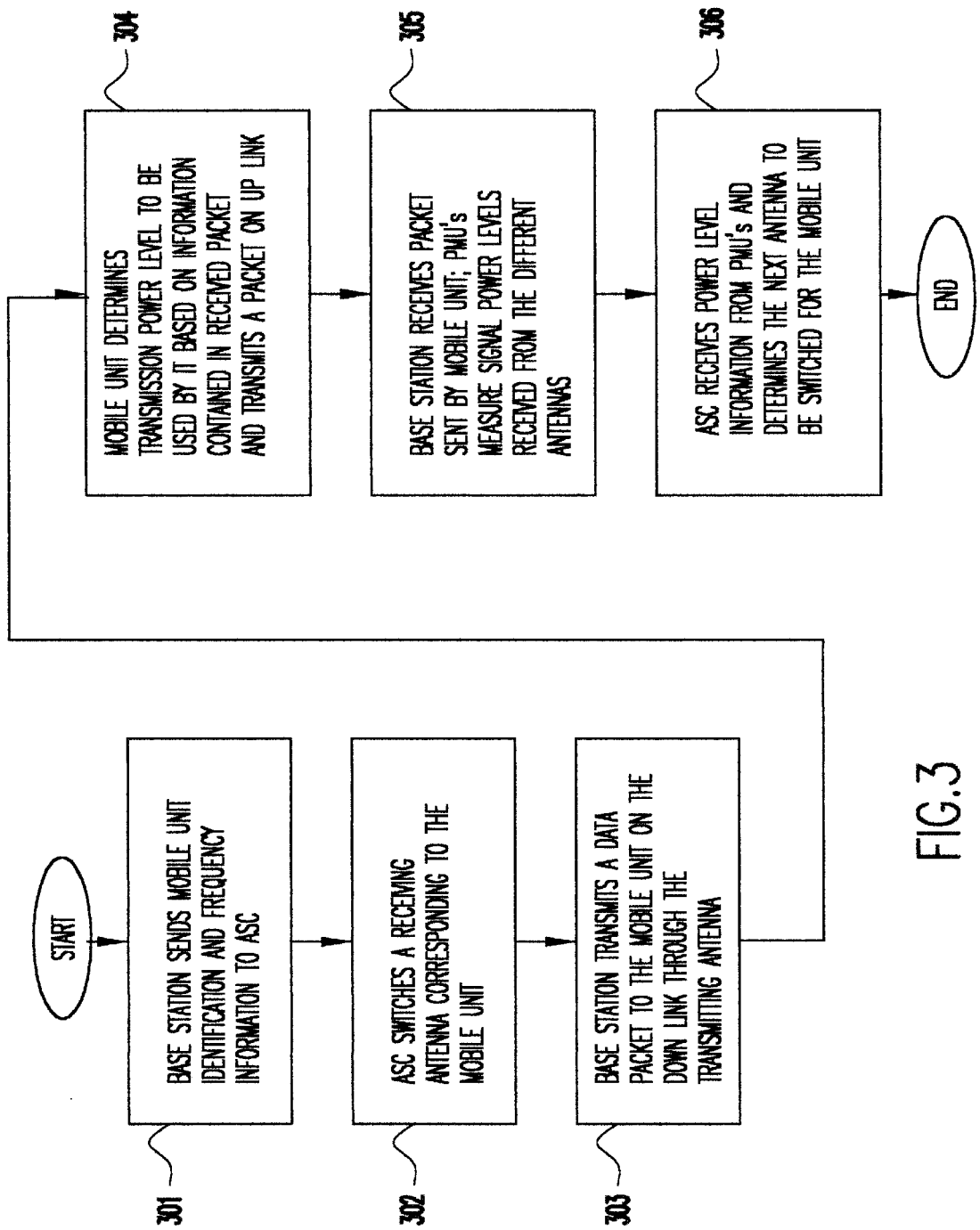
FIG. 3 is a flowchart showing the antenna switching procedure.

A flowchart for the antenna selection operation is given in FIG. 3. At the beginning of downlink transmission, the base station sends to the ASC information about the mobile unit which is going to respond during the uplink transmission, in step 301. This information could be just the 3-bit active member address (AM_ADDR). The base station also indicates to ASC the frequency that will be used by a mobile unit for transmissions during the uplink time-slot.

After receiving mobile unit identification, ASC switches a corresponding receiving antenna for receiving transmissions from the mobile unit, in step 302. The receiving antenna selected at this stage could be just the last receiving antenna used for that mobile. Alternatively, any other suitable scheme for choosing an antenna could be used. For example, a history of the last few choices for receiving antenna for every mobile unit can be maintained, and an antenna can be chosen based on the general trend of antenna switching. For instance, if the recent three antenna selections are the same, there is a great chance that the mobile unit is positioned in the vicinity of that receiving antenna. Therefore, the same receiving antenna can be chosen. However, when the base station is starting communication with a mobile unit for the first time, it is preferable to switch the receiving antenna which is located closest to the center of the pico-cell. This ensures that sufficient signal strength is received by the base station during the first uplink packet transmission from a mobile unit.

The base station then proceeds in step 303 with its downlink transmission to the mobile unit. In this transmission, power level to be used by the mobile unit for its transmission to the base station is communicated through payload part of a data packet. While a large number of discrete transmission power levels could be defined, generally eight or sixteen power levels are sufficient to achieve considerable minimization of battery charge used for transmissions. Thus, power level information can be communicated to a mobile unit by using just about 4-bits in the data payload.

After reception of packet from the base station, the mobile unit proceeds in step 304 with its transmission at a power level indicated by the base station. The base station now receives in step 305 the packet from the mobile unit through the receiving antenna selected by the ASC. Simultaneously, the PMUs receive the transmissions from the mobile unit and determine the relative power levels received from the different antennas. The ASC then receives the power level information from the PMUs in step 306 and normalizes the various power values with reference to the maximum received power level. The normalized power level values are stored in memory. The ASC utilizes this information in conjunction with already stored information about recent antenna switchings to determine the next receiving antenna to be connected for the mobile unit.

Performance Evaluation

Figure 4:
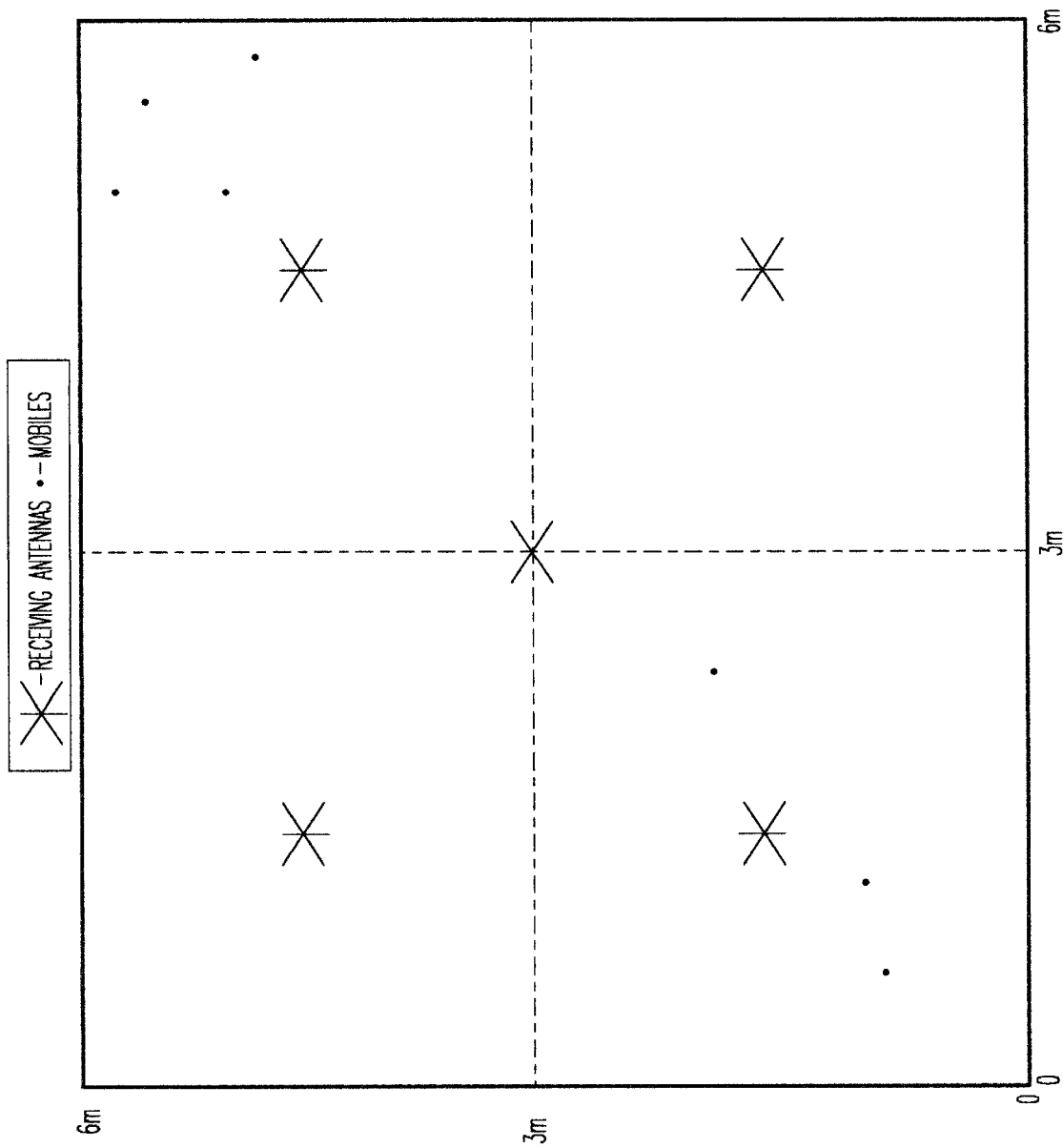
FIG. 4 is a plan view showing the placement of five receiving antennas and positions of seven mobile units in two clusters within a square pico-cell.
Figure 5:
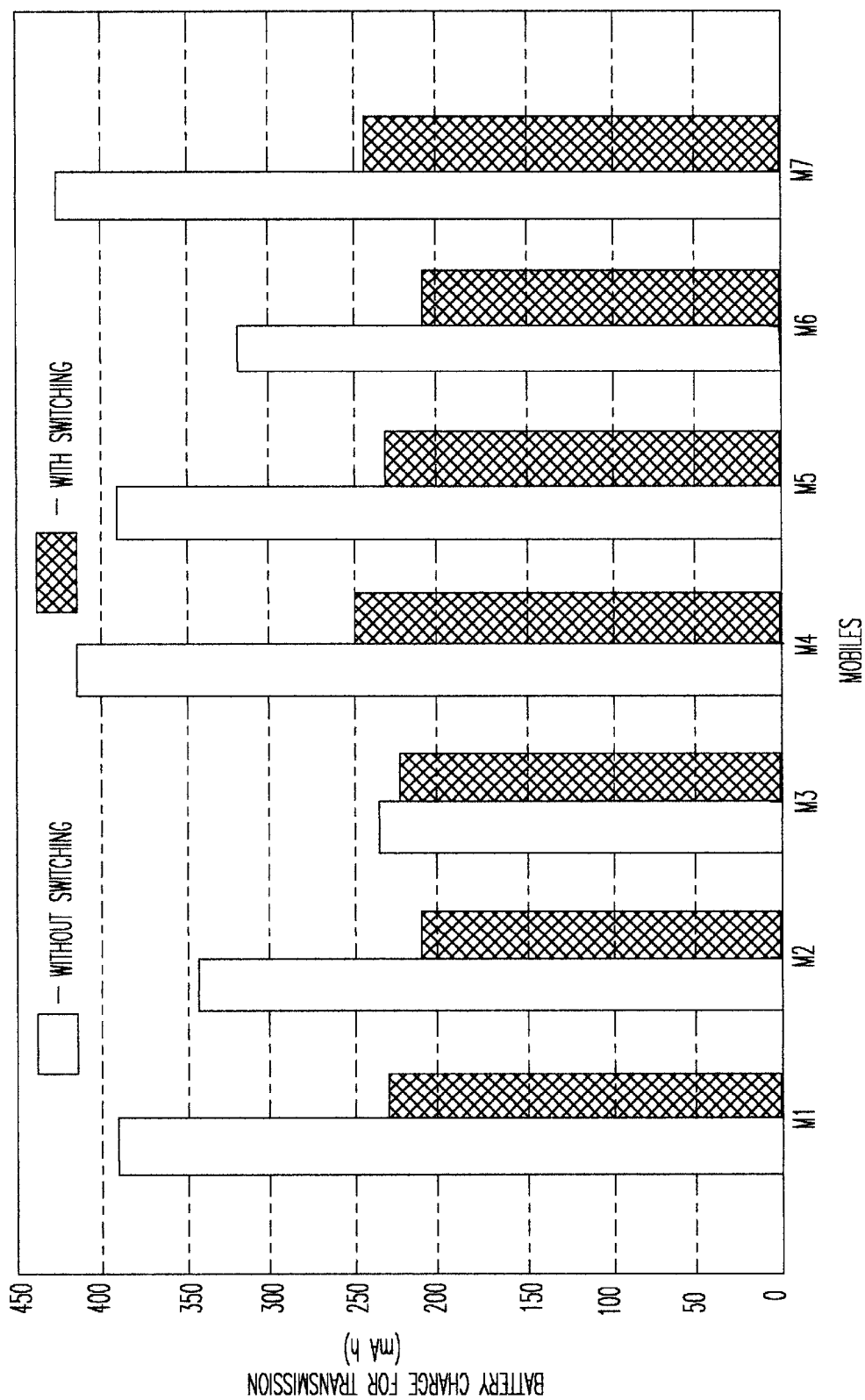
FIG. 5 is a histogram showing battery charge consumed for mobile unit transmission for the scenario shown in FIG. 4.
Figure 6:
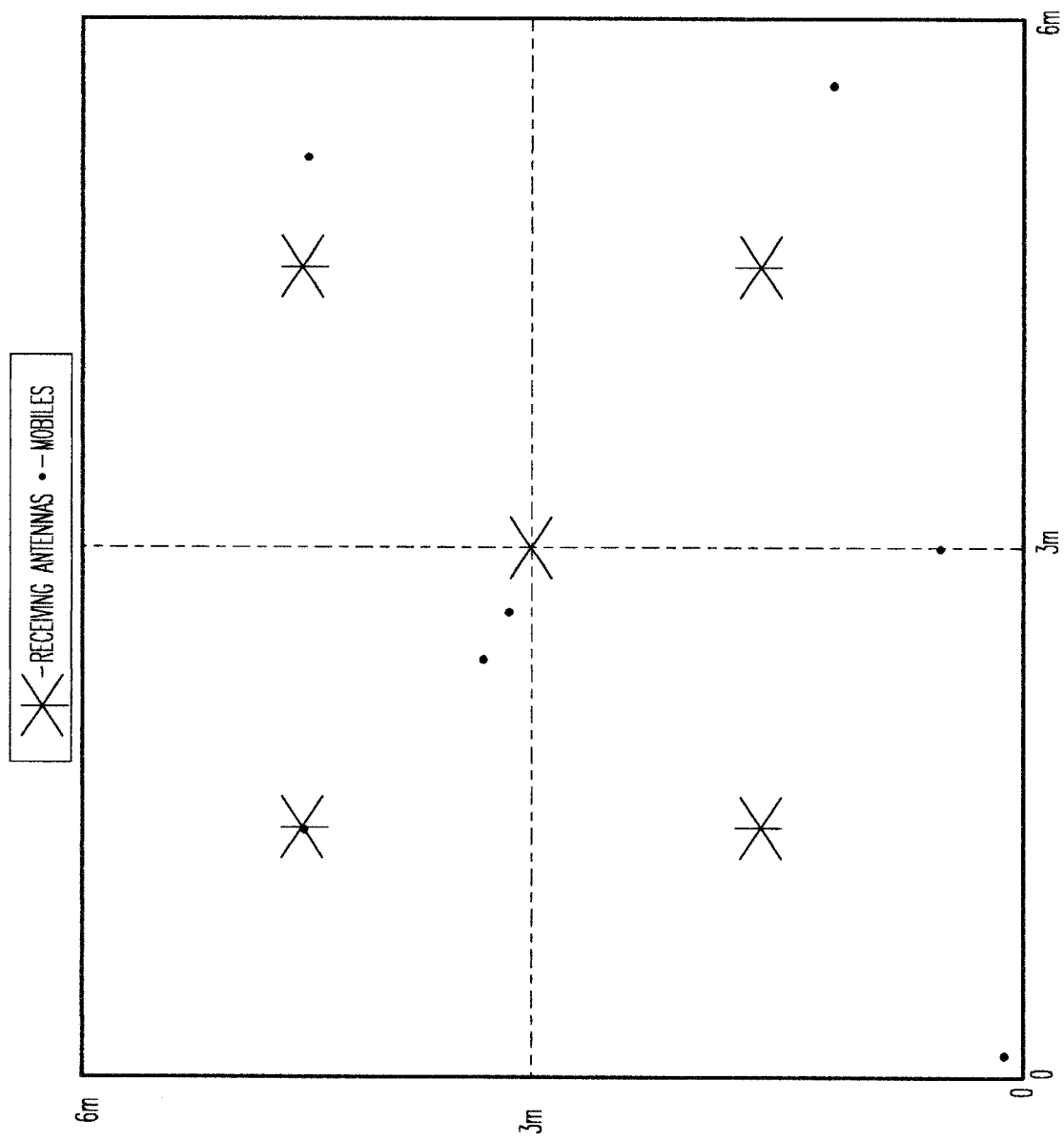
FIG. 6 is a plan view showing placement of five receiving antennas and positions of seven mobile units distributed randomly within a square pico-cell.
Figure 7:
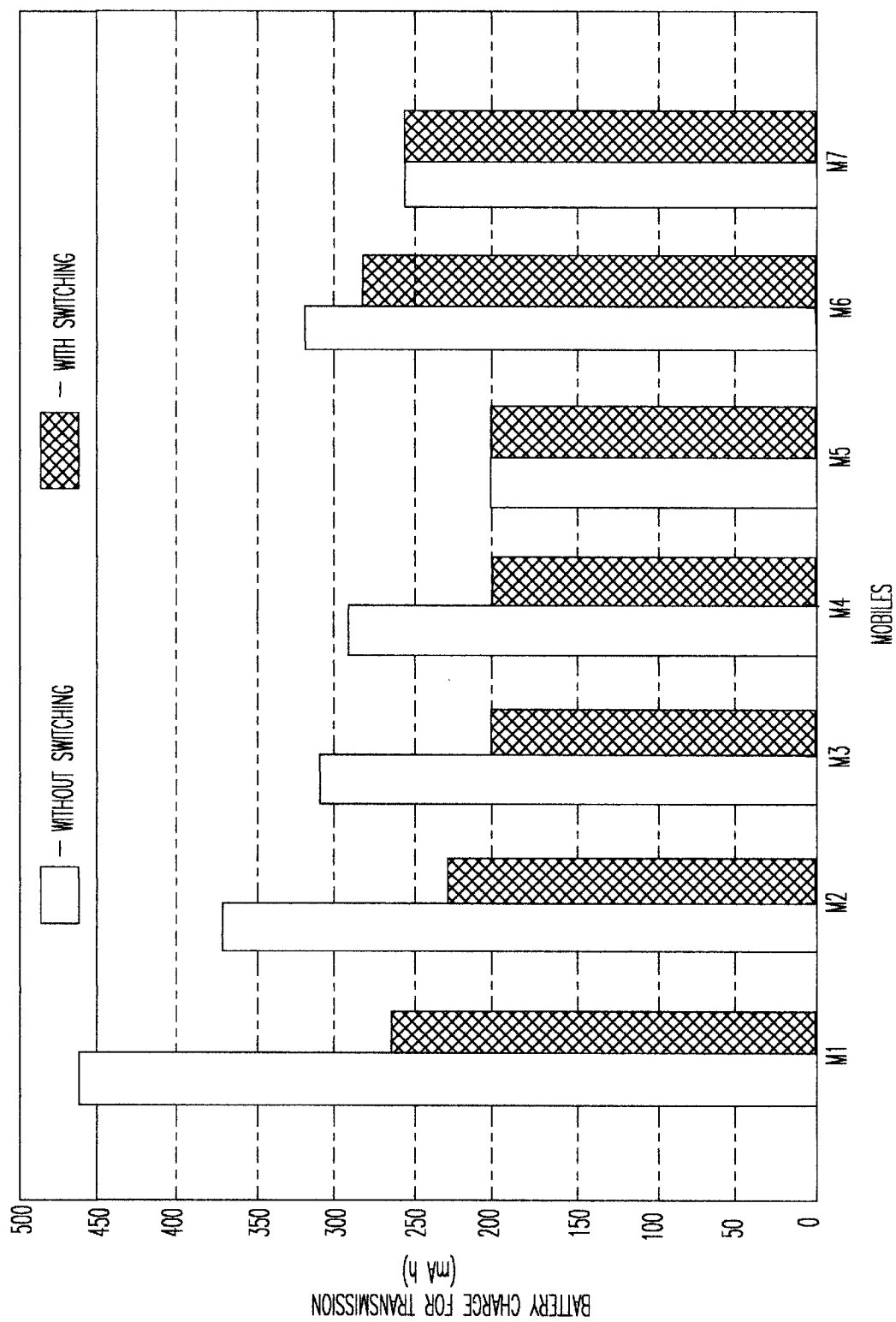
FIG. 7 is a histogram showing battery charge consumed for mobile unit transmissions for the scenario shown in FIG. 6.
Figure 8:
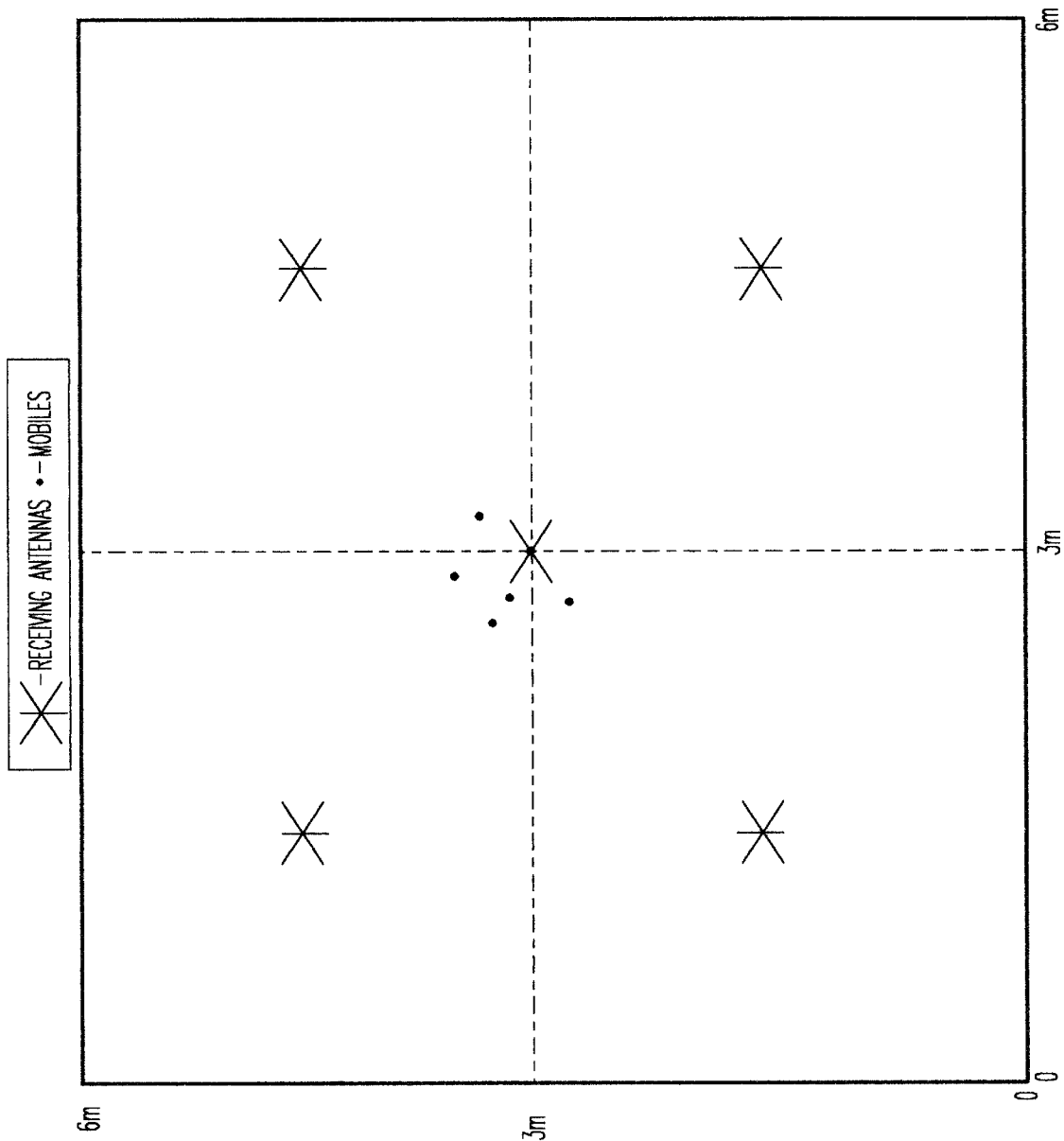
FIG. 8 is a plan view showing placement of five receiving antennas and positions of seven mobile units clustered around the central antenna.

The performance of the antenna switching scheme was evaluated by simulating transmissions within a square pico-cell with seven mobile units, and battery charge consumed was compared with the case of single transmitting and receiving antenna placed at the center of the cell. Five receiving antennas and one transmitting antenna were assumed to be placed as shown in FIG. 4. One set of simulations was run with the mobile units assumed to be stationary at different points within the cell. Another simulation run was carried out with the mobile units moving in a random manner within the pico-cell. To simplify simulations, movement of mobiles units was simulated by changing their positions at regular intervals of time. Also, the mobile unit positions were constrained to the intersection points of a 10×10 square grid covering the pico-cell. The mobile units were served in a time-division multiplexed manner. The radio propagation exponent assumed was 3.5 which is typical for indoor environments. As power is proportional to square of current, the value of 3.5 for radio propagation exponent makes the current required for transmission to be proportional to distance from antenna raised to the power 1.75. Accordingly the following expression for transmitted current was assumed:

$$I = I_0 + c \times (d^{1.75})$$

where $I_0$ is the minimum transmission current, d is the distance of a mobile unit from a receiving antenna, and c is a constant. The constant "c" is found by knowing the transmitted current required when "d" has the maximum value, which in the current simulations is the length of the diagonal of the square cell. Some relevant simulation data is given in Table 1.

TABLE 1

| Simulation Data | |
|---|---|
| Maximum value of I | 30 mA |
| $I_0$ | 5 mA |
| Interval between position changes for mobile units | Exponentially distributed with a mean of 3 minutes |
| Dimension of the side of the square cell | 6 m |
| Simulation time | 300 hours |

Figure 9:
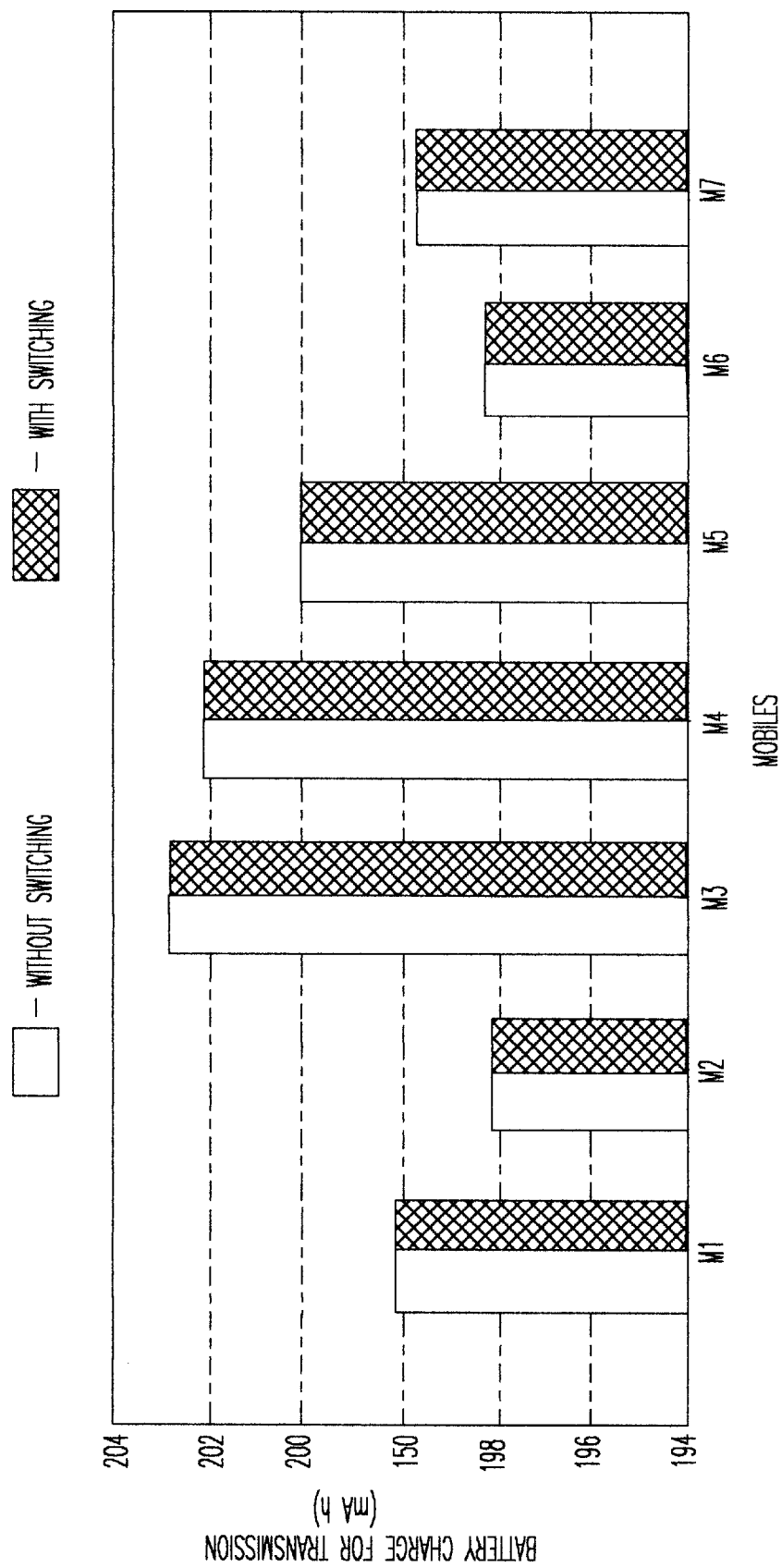
FIG. 9 is a histogram showing battery charge consumed for mobile unit transmissions for the scenario shown in FIG. 8.
Figure 10:
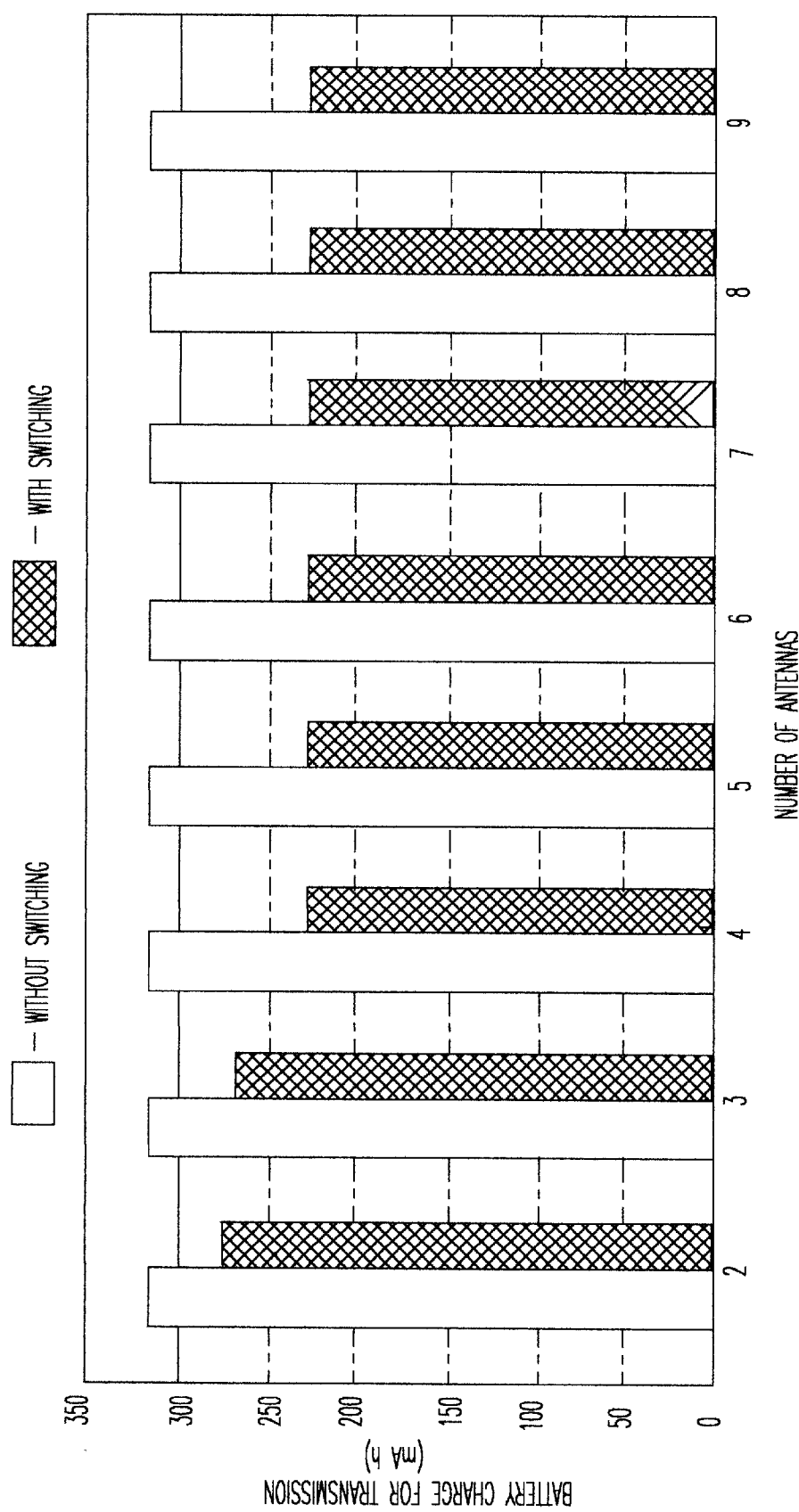
FIG. 10 is a histogram showing battery charge consumed for mobile unit transmissions for the case of mobile units moving within the pico-cell.

The different simulation scenarios and results are shown in FIGS. 4 to 11. As seen from FIGS. 5, 7 and 10, the method of antenna switching results in considerable reduction in battery charge consumption. FIG. 9 shows the results for the case shown in FIG. 8 in which all the mobile units are clustered around the central antenna. These results show clearly that in the worst case the performance of the method according to the invention is at least as good as the single antenna case.

Figure 11:
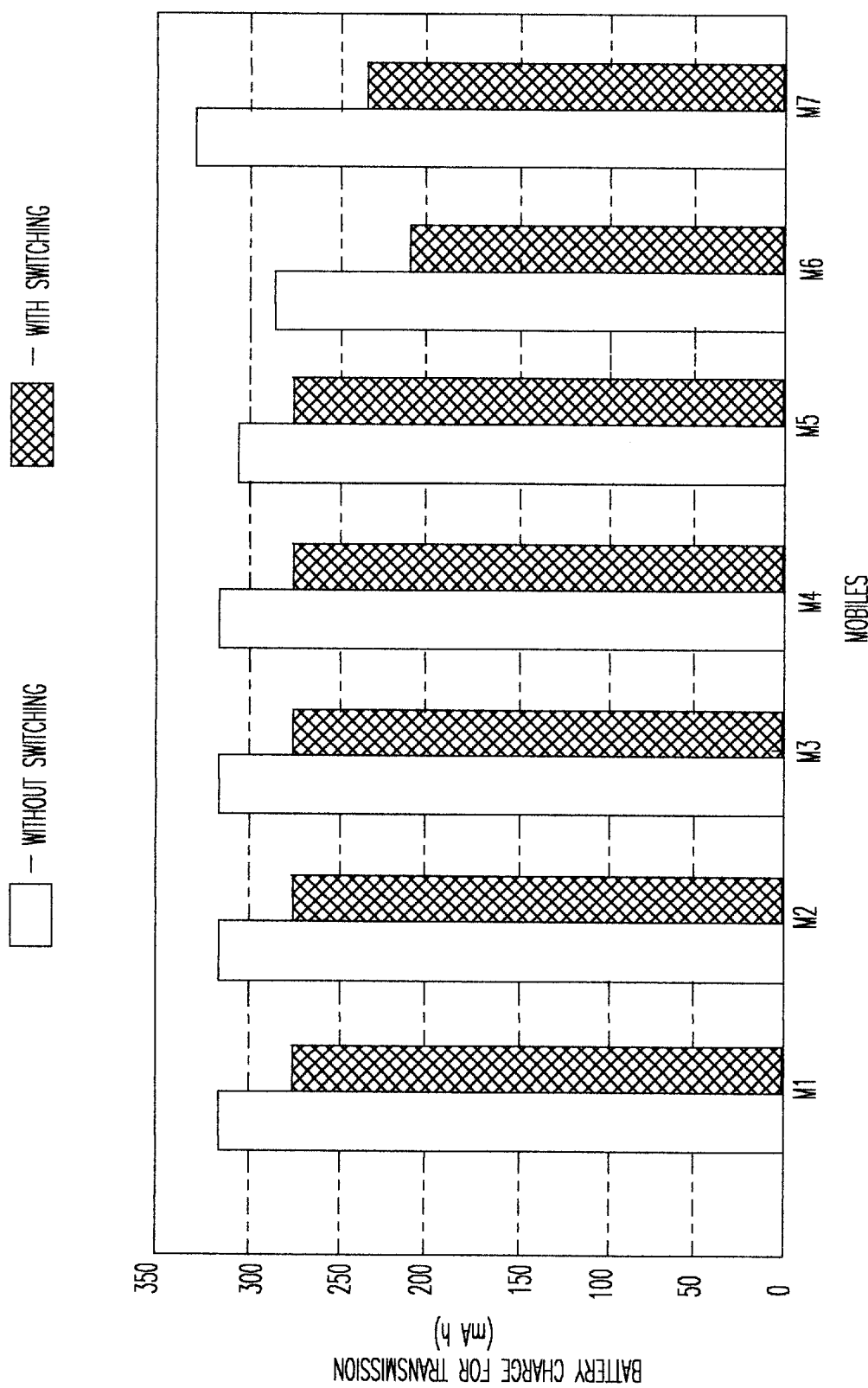
FIG. 11 is a histogram showing average battery charge consumed for mobile unit transmissions with different number of receiving antennas and with the mobile units moving within the pico-cell.

FIG. 11 shows the reduction in battery charge when different number of receiving antennas are used. This simulation result indicates that, for the square pico-cell, battery charge reduction with two or three antennas is almost the same, whereas a higher improvement is possible when four antennas are used. However, increasing the number of antennas beyond four results in only incremental reduction in battery charge. Therefore, in practice it is preferable to use two or four receiving antennas for achieving cost-effective performance improvement. Similarly, for other types of pico-cells encountered in practice, an optimum number of receiving antennas can be provide depending on the actual shape of the pico-cells.

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. A method of minimizing battery discharge of mobile communications devices in short range wireless radio communication networks comprising the steps of:

providing multiple receiving antennas and a single separate transmitting antenna, measuring power of a signal received from a mobile communication device at each receiving antenna, switching receiving antennas for each mobile communication device to minimize transmitted power required by a mobile communication device by selecting only a single receiving antenna based on prior recent uplink power measurements, and instructing a mobile communication device by a base station as to a power level to use for the next uplink transmission.

2. The method recited in claim 1, wherein the step of antenna switching comprises the steps of maintaining a database of switchings for mobile communication devices, and selecting only a single receiving antenna based on most recent switching.

3. A method of minimizing battery discharge of mobile communication devices in short range wireless radio communication networks comprising the steps of:

transmitting from a base station to a mobile communication device a data packet on a downlink through a single transmitting antenna, determining at the mobile communication device a transmission power level to be used based on information from a received data packet to the base station, transmitting by the mobile communication device a data packet to the base station on an uplink, measuring at the base station power levels of a data packet received from the mobile communication device on a plurality of receiving antennas separate from the transmitting antenna, determining from said measured power levels a next receiving antenna from the plurality of receiving antennas to be switched for receiving signals from the mobile communication device, and switching receiving antennas to minimize transmitted power required by the mobile communication device by selecting only a single receiving antenna.

4. The method recited in claim 3, further comprising the steps of:

initially determining by the base unit a receiving antenna to be switched for receiving signals from the mobile communication device before the step of transmitting, and switching to the initially determined receiving antenna.

5. The method recited in claim 4, wherein the step of initially determining a receiving antenna comprises the steps of:

maintaining a database of switchings for mobile communication devices, and selecting a receiving antenna based on most recent switchings.

6. The method recited in claim 4, wherein the step of initially determining a receiving antenna comprises the steps of:

storing an indication of a last used receiving antenna of the mobile communication device, and selecting a receiving antenna based on the last used receiving antenna.

7. The method recited in claim 4, wherein the step of initially determining a receiving antenna comprises the step of selecting a centrally located receiving antenna.

8. An apparatus for minimizing battery discharge of mobile communication devices in short range wireless radio communication networks comprising:

a single transmitting antenna connected to a base station for communicating with one or more mobile communication devices, a plurality of receiving antennas separate from the transmitting antenna for receiving signals from a mobile communication device, and means for switching receiving antennas for the mobile communication devices to minimize transmitted power required by a mobile communication device by selecting only a single receiving antenna based on prior recent uplink power measurements, said means comprising a power measurement unit for each of the plurality of receiving antennas, and an antenna switch controlled by measured power of a received signal from a device.

9. The apparatus recited in claim 8, said means for switching receiving antennas further comprising:

a signal splitter for each of the plurality of receiving antennas, each said splitter providing an output to a corresponding power measurement unit and an output to the antenna switch, and an antenna switching controller receiving outputs from the power measuring units and controlling the antenna switch.

10. The apparatus recited in claim 9, wherein a first and weaker signal part from a signal splitter is connected to a corresponding power measuring unit, and a second and stronger signal part from the signal splitter is connected to an input of the antenna switch.

11. The apparatus recited in claim 10, wherein the power measuring units can tune to transmissions from a mobile communication device and determine relative strength of the received signal excluding interfering signals, if any.

12. The apparatus recited in claim 9, wherein the antenna switching controller determines a receiving antenna which receives the maximum signal power during a current measurement interval, as a next receiving antenna to be switched.

13. The apparatus recited in claim 9, wherein the antenna switching controller determines a next antenna to be switched based on stored past values of signal power levels received from a mobile communication device through the plurality of receiving antennas.

14. The apparatus recited in claim 8, wherein the transmitting antenna is located such that a given geographical space is covered by its transmissions and sufficiently high power levels are received by mobile communication devices at all points within the space.

15. The apparatus recited in claim 14, wherein the plurality of receiving antennas are uniformly distributed within the coverage space to ensure that optimum transmitted signal power level is required by a mobile unit.

16. The apparatus recited in claim 15, wherein a receiving antenna is located at the same location as the transmitting antenna.

17. The apparatus as recited in claim 8, wherein the receiving antenna switched for a mobile communication device during a first packet reception is a receiving antenna which is closest to a center of an area covered by the transmitting antenna.

* * * * *